(12) United States Patent
Krishnan

(10) Patent No.: US 12,061,940 B2
(45) Date of Patent: Aug. 13, 2024

(54) NPA: NO CODE POINT-TO-POINT DATA INTEGRATION TOOL

(71) Applicant: Data Finz, Inc., Plano, TX (US)

(72) Inventor: Kavidhasen Krishnan, McKinney, TX (US)

(73) Assignee: DataFinz Inc., McKinney, TX (US)

( * ) Notice: Subject to any disclaimer, the term of this patent is extended or adjusted under 35 U.S.C. 154(b) by 0 days.

(21) Appl. No.: 17/810,416

(22) Filed: Jul. 1, 2022

(65) Prior Publication Data

US 2024/0004736 A1 Jan. 4, 2024

(51) Int. Cl.
G06F 16/20 (2019.01)
G06F 9/445 (2018.01)
G06F 9/54 (2006.01)

(52) U.S. Cl.
CPC .......... G06F 9/547 (2013.01); G06F 9/44505 (2013.01)

(58) Field of Classification Search
None
See application file for complete search history.

(56) References Cited

U.S. PATENT DOCUMENTS

| | | | | |
|---|---|---|---|---|
| 11,693,720 | B1* | 7/2023 | Srinivasan | G06F 9/547 719/328 |
| 2013/0304530 | A1* | 11/2013 | Chodavarapu | G06Q 10/067 705/7.11 |
| 2019/0138376 | A1* | 5/2019 | Christy Jesuraj | G06F 9/54 |
| 2020/0097373 | A1* | 3/2020 | Zhao | G06F 11/1471 |
| 2021/0334250 | A1* | 10/2021 | Desmarets | G06F 16/248 |
| 2022/0382669 | A1* | 12/2022 | HK | G06F 11/3692 |
| 2023/0109718 | A1* | 4/2023 | Polen | G06F 16/211 707/803 |

* cited by examiner

*Primary Examiner* — Andy Ho
*Assistant Examiner* — Abdou K Seye
(74) *Attorney, Agent, or Firm* — BOAG LAW, PLLC

(57) ABSTRACT

Point-to-point data integration methods and systems may include receiving a source payload, generating an entity relationship diagram based on the source payload, generating structured data based on the source payload, generating a representational state transfer application programming interface based on the structured data, and publishing an application programming interface endpoint configured to receive a call to the representational state transfer application programming interface from a third-party application via an internet connection.

20 Claims, 10 Drawing Sheets

NPA: NO CODE POINT-TO-POINT DATA INTEGRATION TOOL

BACKGROUND

Many businesses and other entities require data from various source systems to enhance and augment business activities. Such source systems may be in remote servers or Cloud environments or local on-premise servers with different structures of data.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

In some implementations, a method may include receiving, at a processor of an application server, a source payload; generating, using the processor, an entity relationship diagram based on the source payload; generating, using the processor, structured data based on the source payload; generating, using the processor, a representational state transfer application programming interface based on the structured data; and publishing, using the processor, an application programming interface endpoint configured to receive a call to the representational state transfer application programming interface from a third-party application via an internet connection.

In other implementations, a system may include a processor of an application server and an electronic storage device in electronic communication with the processor, the electronic storage device having a database stored thereon. The processor may be configured to receive a source payload; generate an entity relationship diagram based on the source payload; generate structured data based on the source payload; generate a representational state transfer application programming interface based on the structured data; and publish an application programming interface endpoint configured to receive a call to the representational state transfer application programming interface from a third-party application via an internet connection.

In yet other implementations, a tangible, non-transient, computer-readable media having instructions thereupon which when implemented by a processor cause the processor to perform a method comprising receiving a source payload; generating an entity relationship diagram based on the source payload; generating structured data based on the source payload; generating a representational state transfer application programming interface based on the structured data; and publishing an application programming interface endpoint configured to receive a call to the representational state transfer application programming interface from a third-party application via an internet connection.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1:
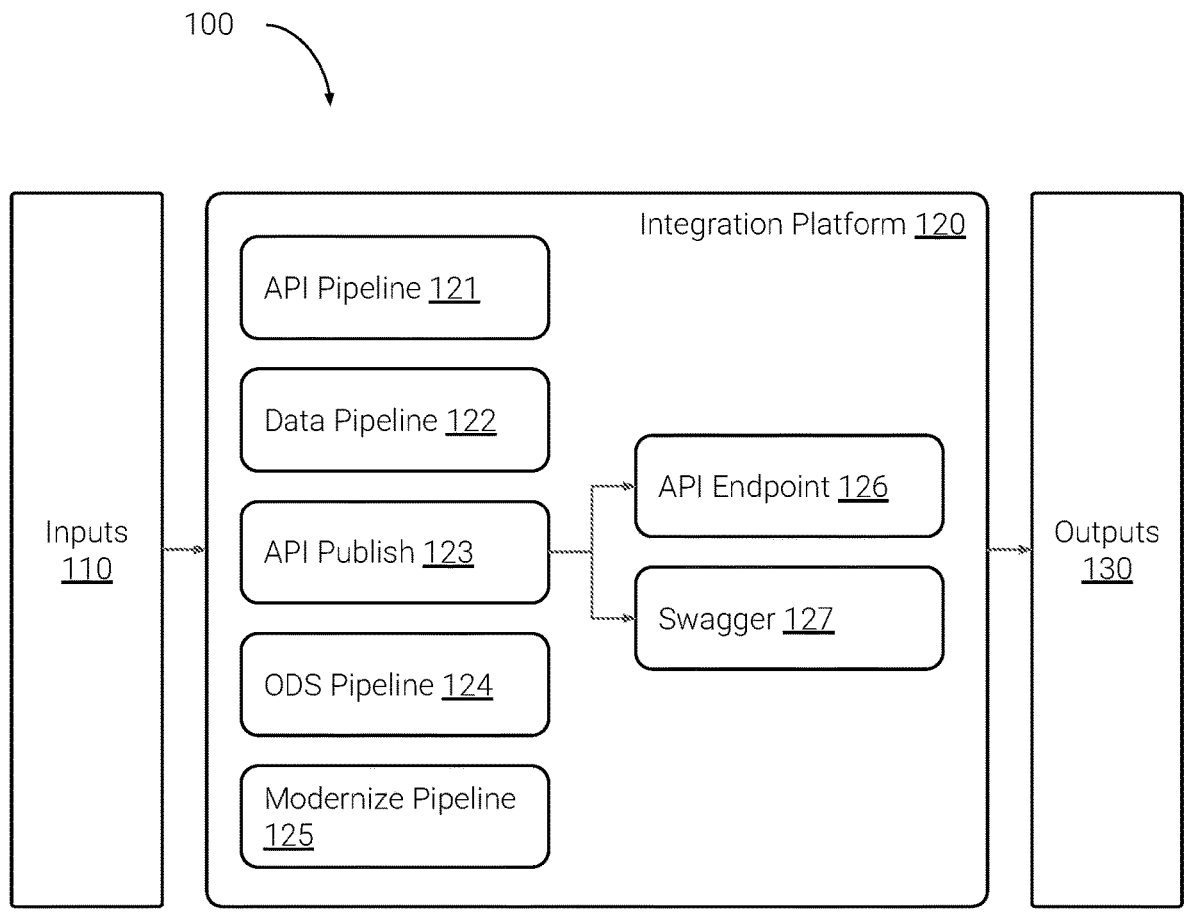
FIG. 1 illustrates an example associated with a point-to-point data integration system, according to an embodiment.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Conventional data integration implementations may incorporate extract, transform, and load (ETL) or integrated Platform-as-a-Service (iPAAS) or custom coding development to connect and perform transformations. For example, one application may request data (whether returned as-is or operated upon) from an application programming interface (API) and the other may feed the data to a downstream system through extract files. Such connections must conventionally be developed and fitted or linked manually, requiring specific programming skill, labor, and cost. With the proliferation of data sources an entity may require access to, integrations become labor-intensive with additional complications in handling different formats of data. Additional challenges are presented in connecting to such data sources, which may lead to prohibitive timelines or costs, preventing implementation of data integration.

Implementations disclosed herein include point-to-point data integration methods covering a variety of implementations in a "no-code" environment. Such implementations may receive a source payload, generate an entity relationship diagram based on the source payload, generate structured data based on the source payload, generate a representational state transfer application programming interface based on the structured data, and publish an application programming interface endpoint configured to receive a call to the representational state transfer application programming interface from a third-party application via an internet connection. Three steps may include a connection step (e.g., to provide source and target connections), a configure step (e.g., to provide configurations at an object level), and an integrate step (e.g., to handle integration activities per the configurations connecting the source and the target).

In some implementations, a method may include receiving data from REST APIs as a response to in-house systems or push data to REST APIs as payload from in-house systems. In-house systems mostly may be in structured format and integrating them with REST APIs may require parsing or conversion so each system may handshake with the other.

It may also be desirable to share data in real time via APIs to an external third party or other business parties. Having secured authentication with a sufficient level of data exposure may be accompanied by, for example, documentation available in the form of SWAGGER™ or Open API.

In some cases, businesses may prefer to maintain a complete history of data changes over the period of time. Such slowly changing dimensions may be desirable for critical datasets, which may provide regulatory value to the business.

Further, with the massive growth of data, legacy EDW platforms may be enhanced to manage the variety, velocity and volume of the data at optimal costs.

Such implementations may provide advantages to entities seeking to automate or integrate platforms. One advantage may be the acceleration of such automation or integration. Another may be freeing time for business operators to focus on other tasks. Yet another may be standardization of integration practices, such that knowledge isn't compartmentalized to the individual or team who set up the integration or automation.

Such implementations may further provide technical advantages over conventional implementations. One such advantage may be the interchangeability and interoperability of systems using a set standard. Another may be an efficiency improvement of integrations or automations and their connections over the internet. FIG. 1 illustrates an example 100 associated with a point-to-point data integration system, according to an embodiment. Example 100 may illustrate a block diagram representing at least some components of a point-to-point data integration system, by showing one or more inputs 110, an integration platform 120, and one or more outputs 130.

Inputs 110 to the integration platform 120 may include data received from a variety of sources, including, for example, another API, internet-of-things (IoT) systems, streams, cloud databases, enterprise data warehouses (EDWs), application databases, big data repositories, enterprise resource planning (ERP) systems, customer relationship management (CRM) systems, file storage, and operational data stores (ODSs).

Integration platform 120 may provide for the generation of an integration available to outputs 130 based on data received from inputs 110. Such integration platform 120 may include an API pipeline module 121, a data pipeline module 122, an API publish module 123, an ODS pipeline module 123, and a modernize pipeline module 125. The API publish module 123 may, for example, publish an API endpoint 126 and/or SWAGGER™ documentation 127 associated with the API.

Outputs 130 of the integration platform 120 may include the provision of access to the newly-generated integration to a variety of sources, including, for example, another API, IoT systems, streams, cloud databases, EDWs, application databases, big data repositories, ERP systems, CRM systems, file storage, and ODSs.

"Data," "content," "digital content," "information," may interchangeably refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

An application programming interface (API) may include an interface implemented by a software program which enables the API to interact with other software. An API may include a programming language that enables communication between computer programs, such as programs of a merchant and programs of a financial institution and/or third party fraud prevention provider programs. An API may be implemented using applications, libraries, and operating systems to determine vocabularies and calling conventions, and may be used to access services associated therewith. An API may include specifications for routines, data structures, object classes, and protocols for communication. An API may describe the ways in which a particular task is performed. An API may define a set of request messages, along with a definition of the structure of response messages (e.g., JavaScript Object Notation (JSON), Extensible Markup Language (XML), Simple Object Access Protocol (SOAP), Hypertext Markup Language (HTML), the like, or combinations thereof). The API may be a backward compatible API. In some cases, the API may replace the need for and/or supplement middleware. Thus, an application programming interface may include various objects that can be instructed by another software application to perform specific tasks or provide specific information upon request.

A representational state transfer (REST) API may include an architectural style and an approach to communications that is used in the development of applications capable of utilizing cloud-based distributed resources. As opposed to a simple object access protocol (SOAP) that writes or uses provided server programs (to serve data) and a client program (to request data), a REST API may utilize a decoupled architecture with a limited and therefore relatively lighter weight communication scheme for utilizing cloud-based distributed resources. As used herein, a REST API may include the formal constraints of a uniform interface separating clients from server resources of the environment 100, a stateless protocol where the client-server communication is further constrained by no client context being stored on an enterprise server between requests from the client, clients and intermediaries may cached responses, a disconnected client-server system with an uniform interface between the client and server, a layered system where a client cannot determine whether the client is connected directly to the end server or to an intermediary along the way, and, optionally, code on demand where a server can temporarily extend a client by transferring executable logic to a client (e.g., such as Java applets, JavaScript, etc.).

Figure 2:
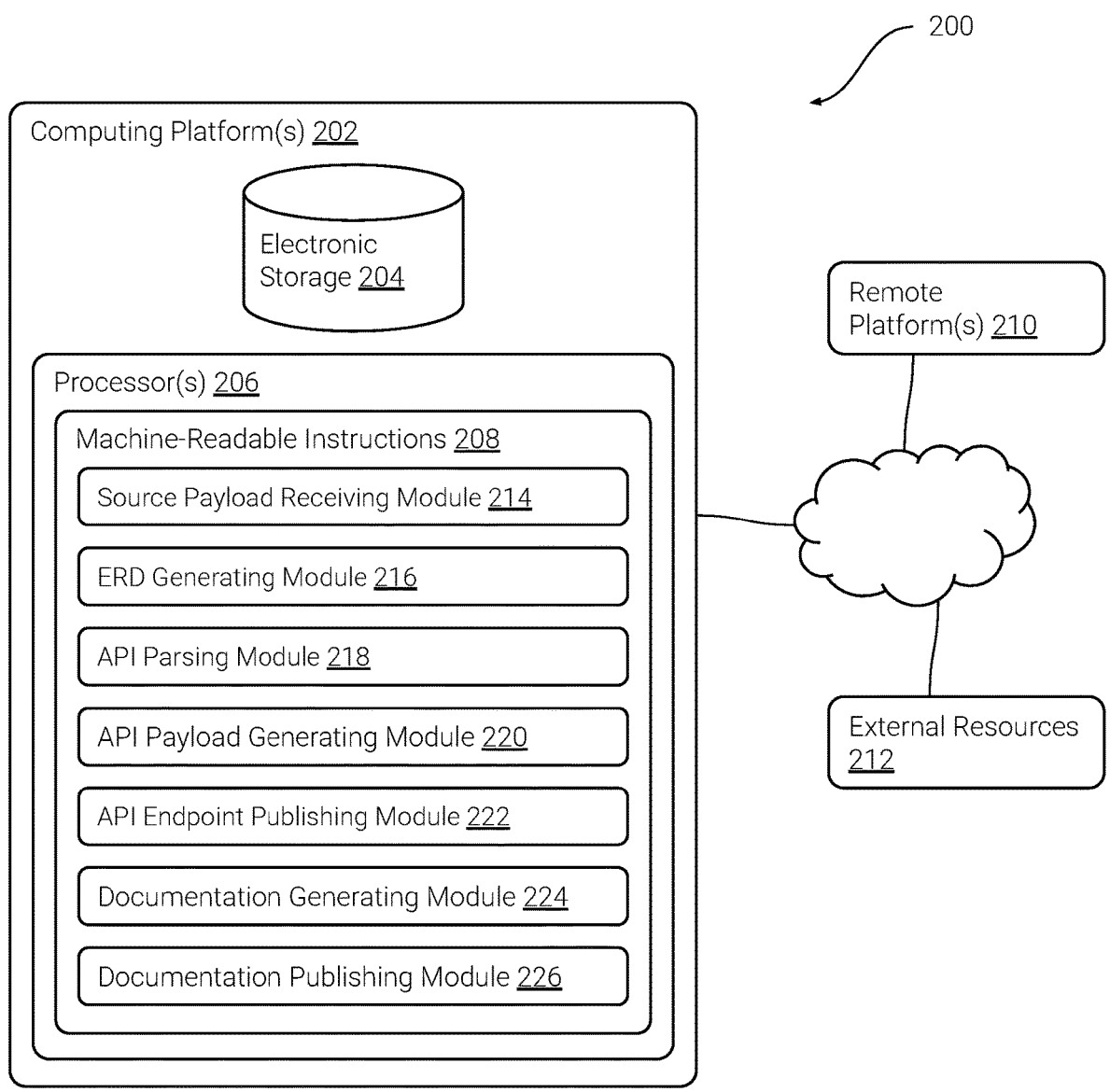
FIG. 2 illustrates a system for point-to-point data integration (e.g., between REST APIs and the structured data sources), according to an embodiment.

FIG. 2 illustrates a system 200 for point-to-point data integration (e.g., between REST APIs and the structured data sources), according to an embodiment. In some embodiments, system 200 may include one or more computing platforms 202. Computing platform(s) 202 may be configured to communicate with one or more remote platforms 210 according to a client/server architecture, a peer-to-peer architecture, and/or other architectures. Remote platform(s) 210 may be configured to communicate with other remote platforms via computing platform(s) 202 and/or according to a client/server architecture, a peer-to-peer architecture, and/or other architectures. Users may access system 200 via remote platform(s) 210.

In some embodiments, computing platform(s) 202, remote platform(s) 210, and/or external resources 212 may be operatively linked via one or more electronic communication links. For example, such electronic communication links may be established, at least in part, via a network such as the internet and/or other networks using, for example, TCP/IP or cellular hardware enabling wired or wireless (e.g., cellular, 2G, 3G, 4G, 4G LTE, 5G, or WiFi) communication. It will be appreciated that this is not intended to be limiting, and that the scope of this disclosure includes embodiments in which computing platform(s) 202, remote platform(s) 210, and/or external resources 212 may be operatively linked via some other communication media.

The internet may include an interconnected network of systems and a suite of protocols for the end-to-end transfer of data therebetween. A model describing may be the Transport Control Protocol and Internet Protocol (TCP/IP), which may also be referred to as the internet protocol suite. TCP/IP provides a model of four layers of abstraction: an application layer, a transport layer, an internet layer, and a link layer. The link layer may include hosts accessible without traversing a router, and thus may be determined by the configuration of the network (e.g., a hardware network implementation, a local area network, a virtual private network, or a networking tunnel). The link layer may be used to move packets of data between the internet layer interfaces of different hosts on the same link. The link layer may interface with hardware for end-to-end transmission of data. The internet layer may include the exchange of datagrams across network boundaries (e.g., from a source network to a destination network), which may be referred to as routing, and is performed using host addressing and identification over an internet protocol (IP) addressing system (e.g., IPv4, IPv6). A datagram may include a self-contained, independent, basic unit of data, including a header (e.g., including a source address, a destination address, and a type) and a payload (e.g., the data to be transported), to be transferred across a packet-switched network. The transport layer may utilize the user datagram protocol (UDP) to provide for basic data channels (e.g., via network ports) usable by applications for data exchange by establishing end-to-end, host-to-host connectivity independent of any underlying network or structure of user data. The application layer may include various user and support protocols used by applications users may use to create and exchange data, utilize services, or provide services over network connections established by the lower layers, including, for example, routing protocols, the hypertext transfer protocol (HTTP), the file transfer protocol (FTP), the simple mail transfer protocol (SMTP), and the dynamic host configuration protocol (DHCP). Such data creation and exchange in the application layer may utilize, for example, a client-server model or a peer-to-peer networking model. Data from the application layer may be encapsulated into UDP datagrams or TCP streams for interfacing with the transport layer, which may then effectuate data transfer via the lower layers.

A given remote platform 210 may include one or more processors configured to execute computer program modules. The computer program modules may be configured to enable an expert or user associated with the given remote platform 210 to interface with system 200 and/or external resources 212, and/or provide other functionality attributed herein to remote platform(s) 210. By way of non-limiting example, a given remote platform 210 and/or a given computing platform 202 may include one or more of a server, a desktop computer, a laptop computer, a handheld computer, a tablet computing platform, a Netbook, a Smartphone, a gaming console, and/or other computing platforms.

External resources 212 may include sources of information outside of system 200, external entities participating with system 200, and/or other resources. In some embodiments, some or all of the functionality attributed herein to external resources 212 may be provided by resources included in system 200.

Computing platform(s) 202 may include electronic storage 204, one or more processors 206, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 204 may comprise non-transitory storage media that electronically stores information. The electronic storage media of electronic storage 204 may include one or both of system storage that is provided integrally (i.e., substantially non-removable) with computing platform(s) 202 and/or removable storage that is removably connectable to computing platform(s) 202 via, for example, a port (e.g., a USB port, an IEEE 1394 port, a THUNDERBOLT™ port, etc.) or a drive (e.g., disk drive, flash drive, or solid-state drive etc.). Electronic storage 204 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 204 may include one or more virtual storage resources (e.g., cloud storage, a virtual private network, and/or other virtual storage resources). Electronic storage 204 may store software algorithms, information determined by processor(s) 206, information received from computing platform(s) 202, information received from remote platform(s) 210, and/or other information that enables computing platform(s) 202 to function as described herein.

Processor(s) 206 may be configured to provide information processing capabilities in computing platform(s) 202. As such, processor(s) 206 may include one or more of a digital processor, an analog processor, a digital circuit designed to process information, an analog circuit designed to process information, a state machine, and/or other mechanisms for electronically processing information. Although processor(s) 206 is shown in FIG. 2 as a single entity, this is for illustrative purposes only. In some embodiments, processor(s) 206 may include a plurality of processing units. These processing units may be physically located within the same device, or processor(s) 206 may represent processing functionality of a plurality of devices operating in coordination. Processor(s) 206 may be configured to execute one or more of the modules disclosed herein, and/or other modules. Processor(s) 206 may be configured to execute one or more of the modules disclosed herein, and/or other modules by software; hardware; firmware; some combination of software, hardware, and/or firmware; and/or other mechanisms for configuring processing capabilities on processor(s) 206. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, model-view-controller (MVC) principles, application programming interfaces (APIs), system-specific programming languages and principles, cross-platform programming languages and principles, pre-compiled programming languages, "byte-code" programming languages, object-oriented programming principles or languages, other programming principles or languages, Java, Microsoft Foundation Classes (MFC), Streaming SIMD Extension (SSE), or other technologies or methodologies, as desired.

It should be appreciated that although the modules disclosed herein are illustrated in FIG. 2 as being implemented within a single processing unit, in embodiments in which processor(s) 206 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor(s) 206 may be configured to execute one or more additional modules that may perform some or all of the functionality attributed herein to one of modules disclosed herein.

Computing platform(s) 202 may be configured by machine-readable instructions 208. Machine-readable instructions 208 may include one or more instruction modules. The instruction modules may include computer program modules. The instruction modules may include one or more of the modules disclosed herein and/or other instruction modules.

A source payload receiving (e.g., REST API connecting) module 214 may include instructions configuring the processor(s) 206 to receive a source payload (e.g., via sending requests and receiving source payload(s) in the form of API responses). The source payload may be received via an API call. The API call may include a REST API call. The source payload may include a variety of data structures, for example, a Javascript Object Notation (JSON) data structure, an extensible markup language (XML) data structure, or an API data structure. The connections may have different security authorizations such as, for example, JSON Web Token (JWT), OAUTH 2.0, etc.

An ERD generating module 216 may include instructions configuring the processor(s) 206 to generate an entity relationship diagram based on the source payload.

An API parsing module 218 may include instructions configuring the processor(s) 206 to generate structured data based on the source payloads (e.g., the API responses). Generating the structured data based on the source payload may include configuring a source detail and a target detail, selecting a data structure based on the source payload (e.g., based on the arrays and the objects in normalized and denormalized structures), applying, using the data structure, a filter to the source payload, and configuring a post script.

An API payload generating module 220 may include instructions configuring the processor(s) 206 to generate API (e.g., REST API) structures with the objects and the arrays as defined in the ERD. Generating the number of objects may also be controlled based on the inputs provided by the user. Generating the REST API may include configuring a source detail and a target detail, selecting a data structure based on the source payload, applying, using the data structure, a filter to the source payload, and configuring a pre script.

An API endpoint generating module 222 may include instructions configuring the processor(s) 206 to publish an application programming interface endpoint configured to receive a call to the representational state transfer application programming interface from a third-party application via an internet connection. The API endpoint may include, for example, a name and an object. Publishing the API endpoint may include configuring the object and the name, selecting an application programming interface method, selecting a field, and applying, using the field, a filter to the application programming interface.

A documentation generating module 224 may include instructions configuring the processor(s) 206 to generate a documentation for the application programming interface endpoint. Such documentation may include, for example, workflows for a user to configure connections, select the necessary attributes, create or modify an integration and execute the integration. Generating the documentation may include configuring a source detail and a target detail, selecting an object from the source payload, applying a filter to the source payload, and selecting a primary key for the object and a target attribute.

A documentation publishing module 226 may include instructions configuring the processor(s) 206 to publish the generated documentation to a website.

Figure 3:
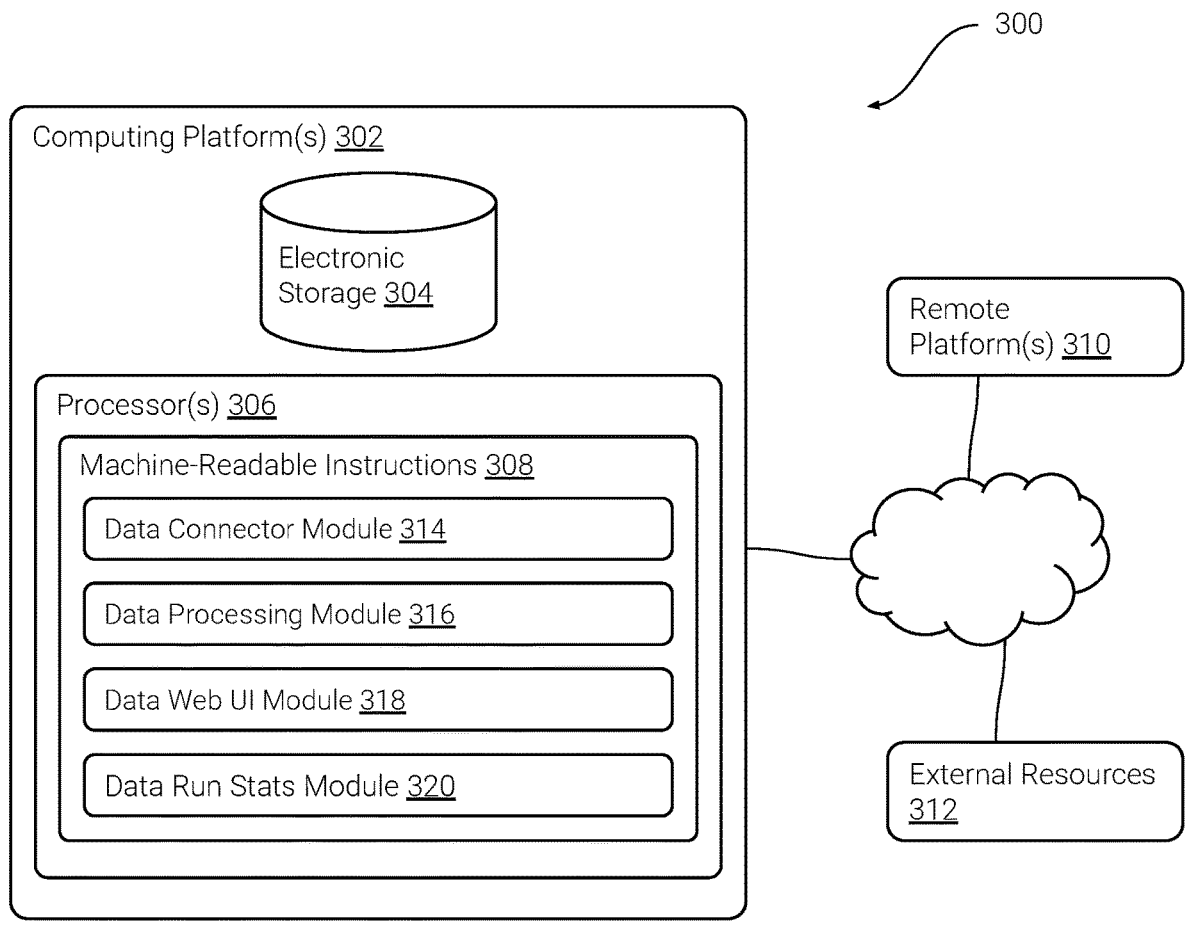
FIG. 3 illustrates a system for point-to-point data integration for simple integration activities, according to an embodiment.

FIG. 3 illustrates a system 300 for point-to-point data integration for simple integration activities, according to an embodiment. In some embodiments, system 300 may include one or more computing platforms 302, which may be similar to computing platform(s) 202. Computing platform(s) 302 may be configured to communicate with one or more remote platforms 310, which may be similar to remote platform(s) 210, according to a client/server architecture, a peer-to-peer architecture, and/or other architectures. Remote platform(s) 310 may be configured to communicate with other remote platforms via computing platform(s) 302 and/or according to a client/server architecture, a peer-to-peer architecture, and/or other architectures. Users may access system 300 via remote platform(s) 310.

A given remote platform 310 may include one or more processors 306, which may be similar to processor(s) 206, configured to execute computer program modules of machine-readable instructions 308, which may be similar to machine-readable instructions 208, which may be stored on an electronic storage 304, which may be similar to electronic storage 204. Processor(s) 306 may further interact with an external resource(s) 312, which may be similar to external resource(s) 212.

A data connector module 314 may include instructions configuring the processor(s) 306 to connect to various data sources like a relational database management system (RDBMS), NoSQL, cloud storage areas, etc. The connections may have different security authorizations like JWT, OAUTH 2.0, etc.

A data processing module 316 may include instructions configuring the processor(s) 306 to copy the data or convert the data format or generate JSON or XML structures or load the data to RDBMS.

A data web user interface (UI) module 318 may include instructions configuring the processor(s) 306 to provide the workflows in a browser for the user to configure connections, select the necessary attributes, create or modify an integration and execute the integration.

A data run stats module 320 may include instructions configuring the processor(s) 306 to browse the run history and view the stats of the completed jobs along with the success or error details.

Figure 4:
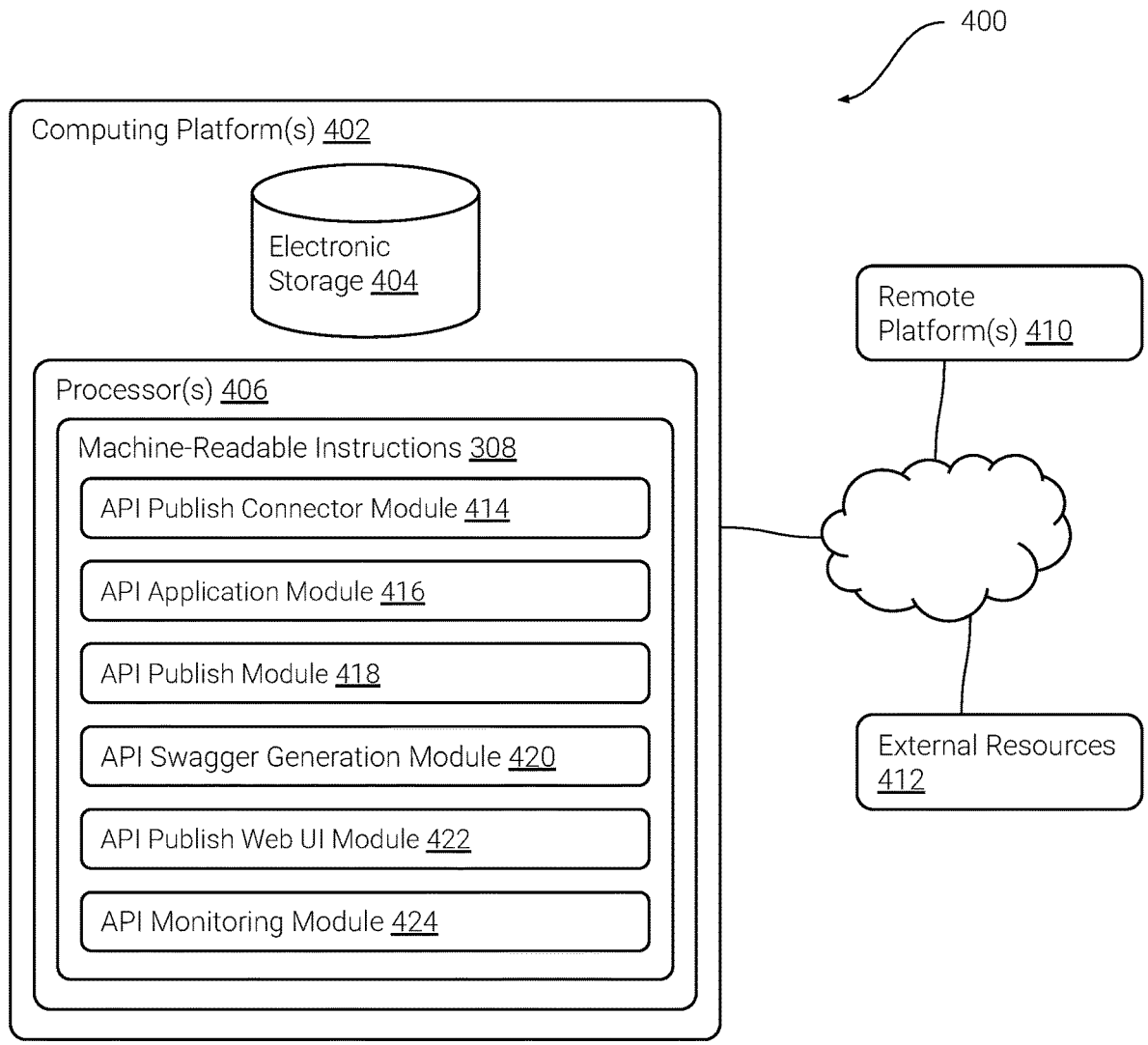
FIG. 4 illustrates a system for exposing data as REST API, according to an embodiment.

FIG. 4 illustrates a system 400 for exposing data as REST API, according to an embodiment. In some embodiments, system 400 may include one or more computing platforms 402, which may be similar to computing platform(s) 202. Computing platform(s) 402 may be configured to communicate with one or more remote platforms 410, which may be similar to remote platform(s) 210, according to a client/server architecture, a peer-to-peer architecture, and/or other architectures. Remote platform(s) 410 may be configured to communicate with other remote platforms via computing platform(s) 402 and/or according to a client/server architecture, a peer-to-peer architecture, and/or other architectures. Users may access system 400 via remote platform(s) 410.

A given remote platform 410 may include one or more processors 406, which may be similar to processor(s) 206, configured to execute computer program modules of machine-readable instructions 408, which may be similar to machine-readable instructions 208, which may be stored on an electronic storage 404, which may be similar to electronic storage 204. Processor(s) 406 may further interact with an external resource(s) 412, which may be similar to external resource(s) 212.

An API publish connector module 414 may include instructions configuring the processor(s) 406 to connect to various data sources like RDBMS, cloud storage areas, etc. The connections may have different security authorizations like JWT, OAUTH 2.0, etc.

An API application module 416 may include instructions configuring the processor(s) 306 to maintain the Application details, security mechanisms for authenticating the APIs, control features to whitelist internet protocol (IP) addresses that can access APIs.

An API publish module 418 may include instructions configuring the processor(s) 406 to expose the database objects or Flat files from storage area as an API endpoint with the configured security based on the application and an appropriate API method. It may include the options for the pagination to limit the number of objects per call.

An API SWAGGER™ documentation generation module 420 may include instructions configuring the processor(s) 406 to generate the SWAGGER™ documentation for all the APIs that are configured to an application. The SWAGGER™ documentation may also be accessed via a secure hypertext transport protocol (HTTPS) uniform resource identifier (URI) and perform the calls.

An API publish web UI module 422 may include instructions configuring the processor(s) 406 to provide the workflows in a browser for the user to configure connections, select the necessary attributes, methods, apply filters, create or modify an API endpoint and start/stop the service.

An API monitoring module 424 may include instructions configuring the processor(s) 406 to analyze the usage of APIs such as who is consuming, timeframe it is accessed, approximate data size transferred, etc.

Figure 5:
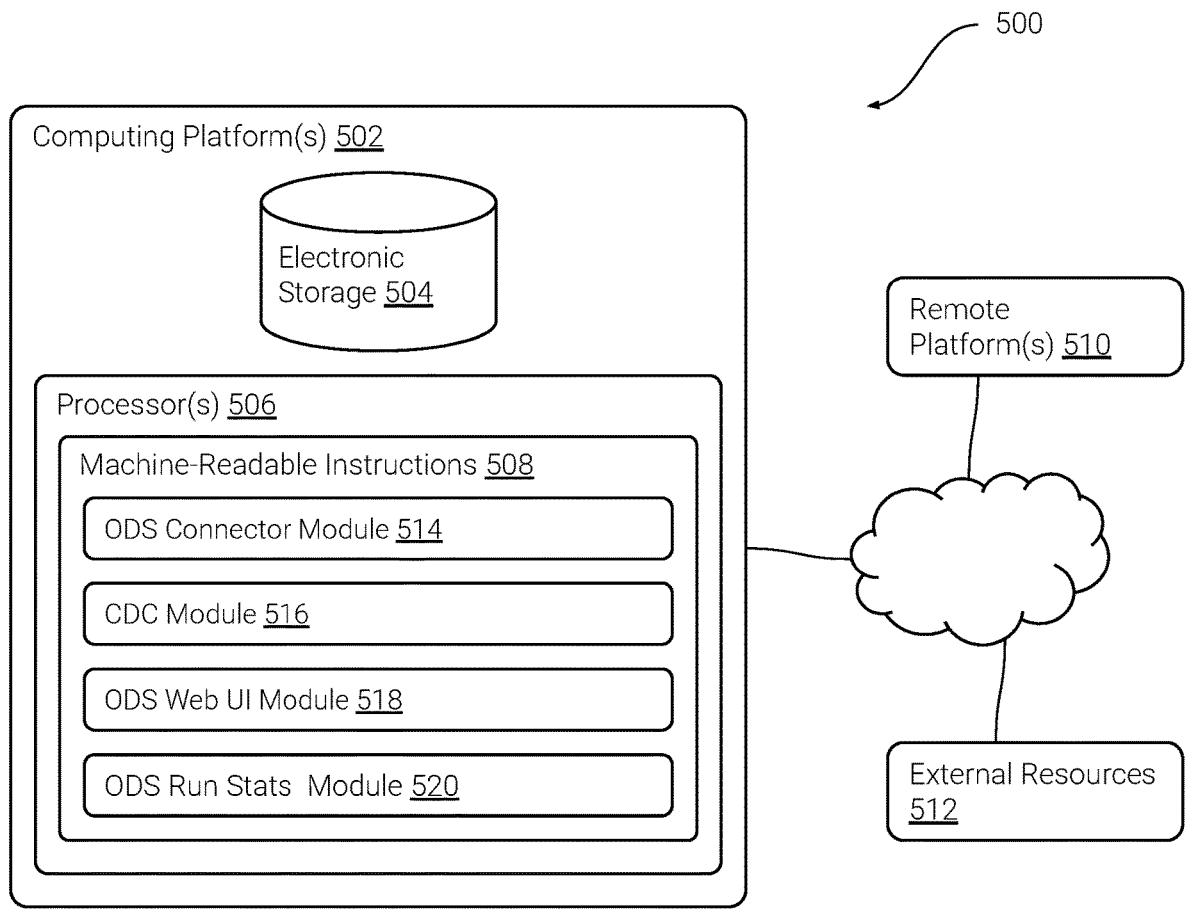
FIG. 5 illustrates a system for building an operational data store (ODS), according to an embodiment.

FIG. 5 illustrates a system 500 for building an operational data store (ODS), according to an embodiment. In some embodiments, system 500 may include one or more computing platforms 502, which may be similar to computing platform(s) 202. Computing platform(s) 502 may be configured to communicate with one or more remote platforms 510, which may be similar to remote platform(s) 210, according to a client/server architecture, a peer-to-peer architecture, and/or other architectures. Remote platform(s) 510 may be configured to communicate with other remote platforms via computing platform(s) 502 and/or according to a client/server architecture, a peer-to-peer architecture, and/or other architectures. Users may access system 500 via remote platform(s) 510.

A given remote platform 510 may include one or more processors 506, which may be similar to processor(s) 206, configured to execute computer program modules of machine-readable instructions 508, which may be similar to machine-readable instructions 208, which may be stored on an electronic storage 504, which may be similar to electronic storage 204. Processor(s) 506 may further interact with an external resource(s) 512, which may be similar to external resource(s) 512.

An ODS connector module 514 may include instructions configuring the processor(s) 506 to connect to various data sources like RDBMS, cloud storage areas, etc. The connections may have different security authorizations like JWT, OAUTH 2.0, etc.

A CDC module 516 may include instructions configuring the processor(s) 506 to perform the change data capture algorithms at the source and the target levels to extract the incremental changes and maintain the versions in the target as Slowly Changing Dimension (SCD) Type-2 level.

An ODS web UI module 522 may include instructions configuring the processor(s) 506 to provide the workflows in a browser for the user to configure connections, select the necessary objects, attributes, apply filters, create or modify an ODS integration and execute the integration.

An ODS run stats module 524 may include instructions configuring the processor(s) 506 to analyze the run history with the stats on the number of inserts, updates and deletes along with the success or error details.

Figure 6:
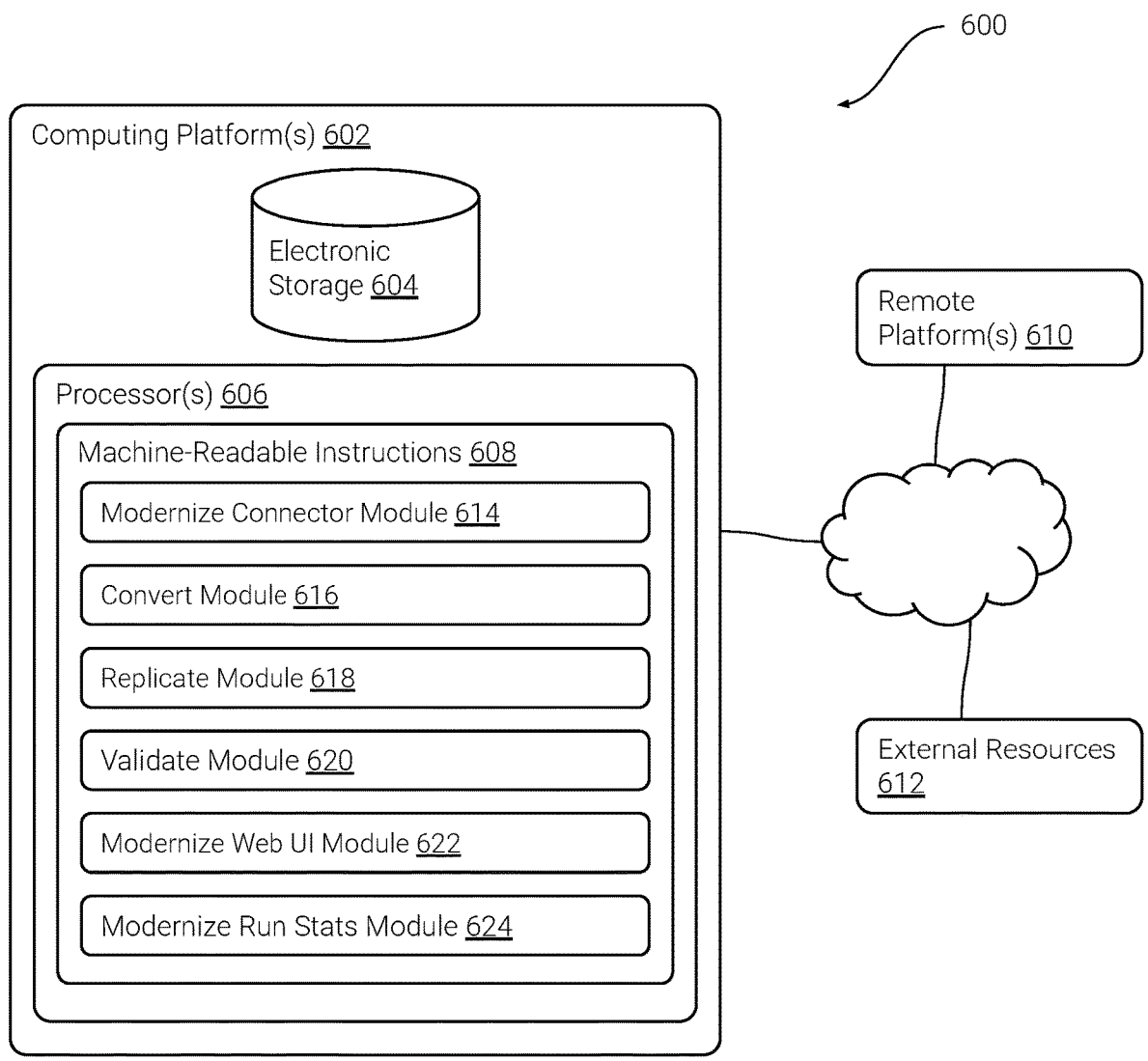
FIG. 6 illustrates a system for modernizing data environments, according to an embodiment.

FIG. 6 illustrates a system 600 for modernizing data environments, according to an embodiment. In some embodiments, system 600 may include one or more computing platforms 602, which may be similar to computing platform(s) 202. Computing platform(s) 602 may be configured to communicate with one or more remote platforms 610, which may be similar to remote platform(s) 210, according to a client/server architecture, a peer-to-peer architecture, and/or other architectures. Remote platform(s) 610 may be configured to communicate with other remote platforms via computing platform(s) 602 and/or according to a client/server architecture, a peer-to-peer architecture, and/or other architectures. Users may access system 600 via remote platform(s) 610.

A given remote platform 610 may include one or more processors 606, which may be similar to processor(s) 206, configured to execute computer program modules of machine-readable instructions 608, which may be similar to machine-readable instructions 208, which may be stored on an electronic storage 604, which may be similar to electronic storage 204. Processor(s) 606 may further interact with an external resource(s) 612, which may be similar to external resource(s) 212.

A modernize connector module 614 may include instructions configuring the processor(s) 606 to connect to various data sources like RDBMS, cloud storage areas, etc. The connections may have different security authorizations like JWT, OAUTH 2.0, etc.

A convert module 616 may include instructions configuring the processor(s) 606 to convert the database objects like data definition languages (DDLs) of tables or views from the legacy data environments into compatible DDLs of the modernized data environments.

A replicate module 618 may include instructions configuring the processor(s) 606 to extract the data from the legacy systems and updates/inserts/deletes the data in the modernized environments. It may compare the data between both the systems and provide the data quality report with the sample of 100 records which are mismatching.

A validate module 620 may include instructions configuring the processor(s) 606 to compare the data between both the systems with options of selecting attributes for the comparison and provide the data quality report with the sample of 100 records which are mismatching. It may also perform validations based on the queries in the semantic or ELT layer.

A modernize web UI module 622 may include instructions configuring the processor(s) 606 to provide the workflows in a browser for the user to configure connections, select the necessary objects, attributes, apply filters, create or modify an integration and execute the integration.

A modernize run stats module 624 may include instructions configuring the processor(s) 606 to analyze the run history with the stats on the number of Inserts, Updates and Deletes along with the success or error details and the data quality percentage.

Figure 7:
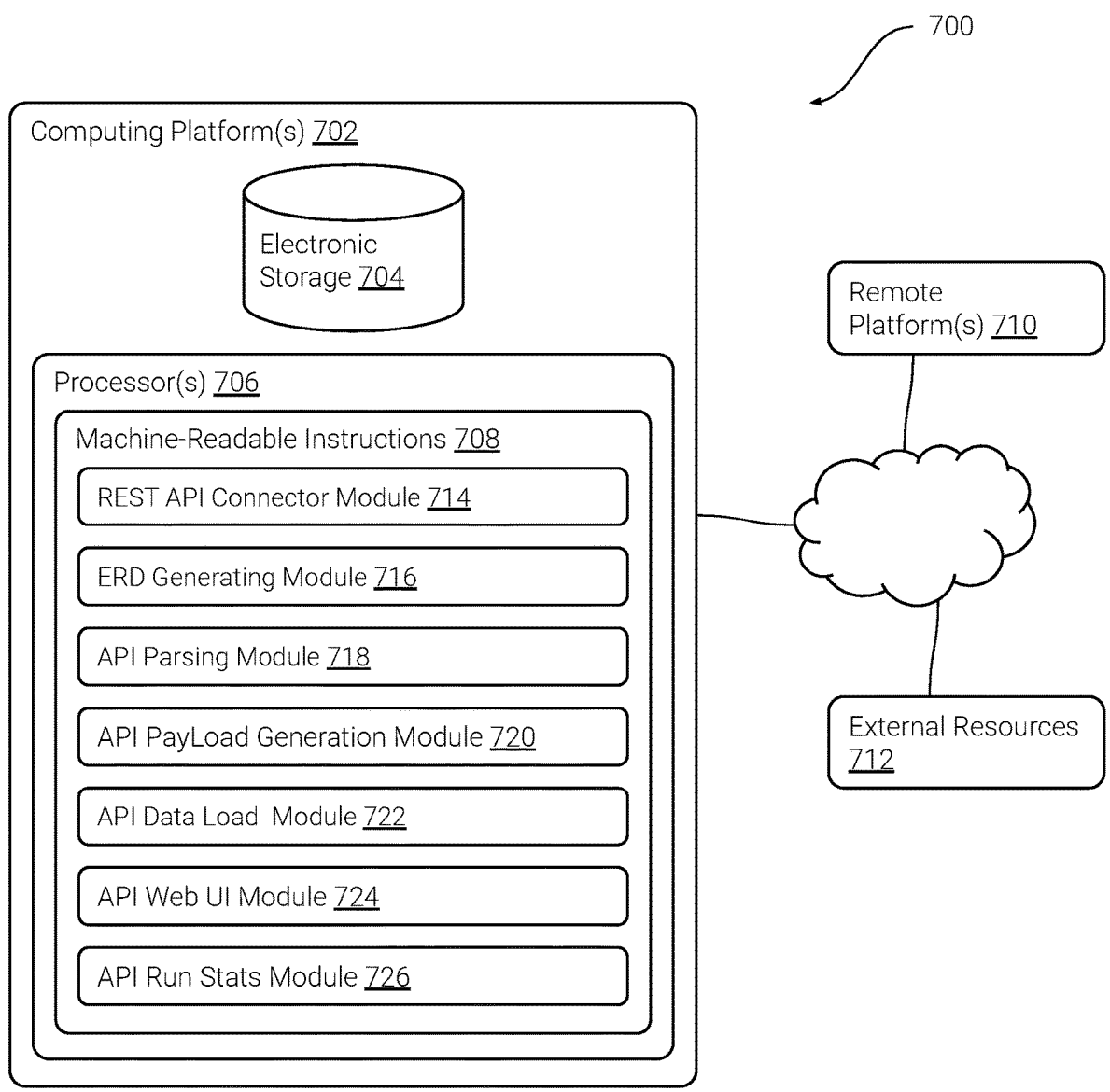
FIG. 7 illustrates a system for point-to-point data integration between REST APIs and the structured data sources, according to an embodiment.

FIG. 7 illustrates a system 700 for point-to-point data integration between REST APIs and the structured data sources, according to an embodiment. In some embodiments, system 700 may include one or more computing platforms 702, which may be similar to computing platform(s) 202. Computing platform(s) 702 may be configured to communicate with one or more remote platforms 710, which may be similar to remote platform(s) 210, according to a client/server architecture, a peer-to-peer architecture, and/or other architectures. Remote platform(s) 710 may be configured to communicate with other remote platforms via computing platform(s) 702 and/or according to a client/server architecture, a peer-to-peer architecture, and/or other architectures. Users may access system 700 via remote platform(s) 710.

A given remote platform 710 may include one or more processors 706, which may be similar to processor(s) 206, configured to execute computer program modules of machine-readable instructions 708, which may be similar to machine-readable instructions 208, which may be stored on an electronic storage 704, which may be similar to electronic storage 204. Processor(s) 706 may further interact with an external resource(s) 712, which may be similar to external resource(s) 212.

A REST API connector module 714 may include instructions configuring the processor(s) 706 to send requests and receive responses. The connections may have different security authorizations like JWT, OAUTH 2.0, etc.

An ERD generating module 716 may include instructions configuring the processor(s) 706 to generate an entity relationship diagram based on the API or JSON or XML structures.

An API parsing module 718 may include instructions configuring the processor(s) 706 to generate structured data based on the API responses. Generating the structured data based on the arrays and the objects in normalized and denormalized structures.

An API payload generating module 720 may include instructions configuring the processor(s) 706 to generate REST API structures with the objects and the arrays as defined in the ERD. Generating the number of objects may also be controlled based on the inputs provided by the user.

An API data load module 722 may include instructions configuring the processor(s) 706 to load or copy the parsed structures into a database (cloud or on-premise) or to any storage locations.

An API web UI module 724 may include instructions configuring the processor(s) 706 to provide the workflows in a browser for the user to configure connections, select the necessary attributes, create or modify an integration and execute the integration.

An API run stats module 726 may include instructions configuring the processor(s) 706 to browse the run history and view the stats of the completed jobs along with the success or error details.

Various steps, functions, and/or operations of computing platform(s) 202/302/402/502/602/702, remote platform(s) 210/310/410/510/610/710, and/or external resources 212/312/412/512/612/712 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor 206/306/406/506/606/706 (or computing platform 202/302/402/502/602/702) or, alternatively, multiple processors 206/306/406/506/606/706 (or multiple computing platforms 202/302/402/502/602/702). Moreover, different sub-systems of system 200/300/400/500/600/700 may include one or more computing or logic systems. Therefore, the description herein should not be interpreted as a limitation on the present disclosure but merely an illustration.

Figure 8:
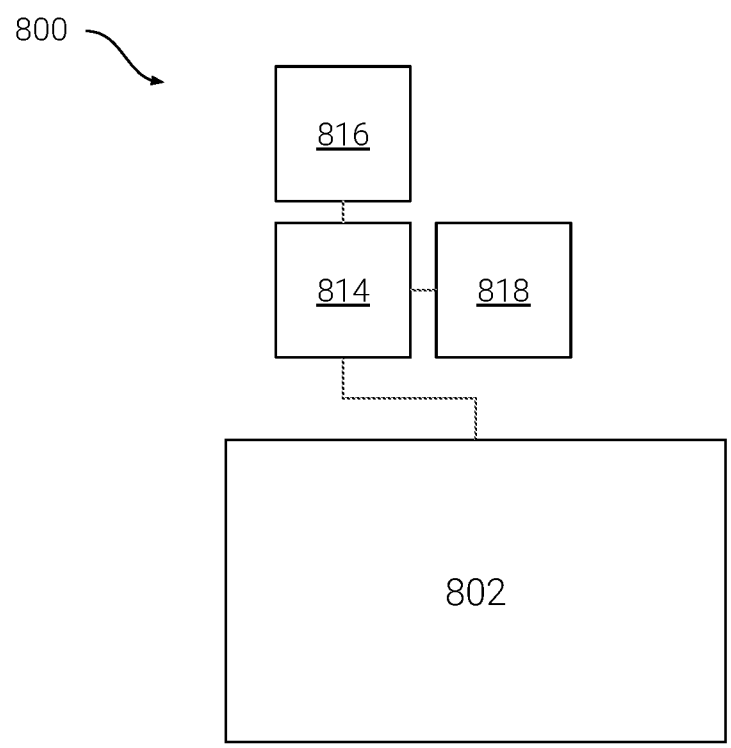
FIG. 8 illustrates a device, upon which a system for point-to-point data integration may operate or interface with, according to an embodiment.

FIG. 8 illustrates a device 800, upon which a system for point-to-point data integration may operate or interface with, according to an embodiment. The system for point-to-point data integration, may be similar to, for example system 200/300/400/500/600/700. Device 800 may be similar to, for example, one or more of computing platform 202/302/402/502/602/702, remote platform 210/310/410/510/610/710, or external resource 212/312/412/512/612/712. While in FIG. 8, device 800 is depicted as a block diagram, it will be understood that device 800 may include various devices, such as, for example, one or more of a server, a desktop computer, a laptop computer, a handheld computer, a tablet computing platform, a Netbook, a Smartphone, a gaming console, and/or other computing platforms.

Device 800 may be configured to communicate with other devices or remote platforms via a computing platform, which may be similar to computing platform(s) 202/302/ 402/502/602/702, and/or according to a client/server architecture, a peer-to-peer architecture, and/or other architectures. Users may access the system for point-to-point data integration, which may be similar to system 200/300/400/ 500/600/700 via device 800.

Device 800 may include various components, all or some of which may be used in operation or use of Device 800. Such components may include, inter alia, a display 802, a processor 814, an electronic storage 816, and a network interface 818. It will be understood that not all of these components are required for every embodiment of device 800, and there may be more than one of any given component in various embodiments of device 800.

Device 800 may include one or more processors configured to execute computer program modules. The computer program modules may be configured to enable an expert or user associated with device 800 to operate or interface with a system for point-to-point data integration, (e.g., similar to system 200/300/400/500/600/700) and/or external resources (e.g., similar to external resource 212/312/412/512/612/ 712), and/or provide other functionality attributed herein to device 800.

Device 800 may include electronic storage 816, one or more processor(s) 814, and/or other components. Device 800 may include communication lines, or ports to enable the exchange of information with a network and/or other computing platforms (e.g., network interface 818). Illustration of device 800 in FIG. 8 is not intended to be limiting. Device 800 may include a plurality of hardware, software, and/or firmware components operating together to provide the functionality attributed herein to device 800. For example, device 800 may be implemented by a cloud of computing platforms operating together as device 800.

Electronic storage 816 may be directly or indirectly in operative electronic communication with processor 814 may comprise non-transitory storage media that electronically stores information. The electronic storage media of electronic storage 816 may include one or both of system storage that is provided integrally (i.e., substantially non-removable) with device 800 and/or removable storage that is removably connectable to device 800 via, for example, a port (e.g., a USB port, an IEEE 1394 port, a THUNDERBOLT™ port, etc.) or a drive (e.g., a disk drive, flash drive, or solid-state drive etc.). Electronic storage 816 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 816 may include one or more virtual storage resources (e.g., cloud storage, a virtual private network, and/or other virtual storage resources). Electronic storage 816 may store software algorithms, information determined by processor(s) 816, information received from device 816, information received from the system or another remote platform, and/or other information that enables device 816 to function as described herein.

Processor(s) 814 may be configured to provide information processing capabilities in device 800. As such, processor(s) 814 may include one or more of a digital processor, an analog processor, a digital circuit designed to process information, an analog circuit designed to process information, a state machine, and/or other mechanisms for electronically processing information. Although processor(s) 814 is shown in FIG. 8 as a single entity, this is for illustrative purposes only. In some embodiments, processor(s) 814 may include a plurality of processing units. These processing units may be physically located within the same device, or processor(s) 814 may represent processing functionality of a plurality of devices operating in coordination. Processor(s) 814 may be configured to execute one or more of the modules disclosed herein, and/or other modules. Processor(s) 814 may be configured to execute one or more of the modules disclosed herein, and/or other modules by software; hardware; firmware; some combination of software, hardware, and/or firmware; and/or other mechanisms for configuring processing capabilities on processor(s) 814. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, model-view-controller (MVC) principles, application programming interfaces (APIs), system-specific programming languages and principles, cross-platform programming languages and principles, pre-compiled programming languages, "bytecode" programming languages, object-oriented programming principles or languages, other programming principles or languages, Java, Microsoft Foundation Classes (MFC), Streaming SIMD Extension (SSE), or other technologies or methodologies, as desired.

It should be appreciated that although the modules disclosed herein are illustrated in FIG. 8 as being implemented within a single processing unit, in embodiments in which processor(s) 814 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor(s) 814 may be configured to execute one or more additional modules that may perform some or all of the functionality attributed herein to one of modules disclosed herein.

Device 800 may be configured by machine-readable instructions. Such machine-readable instructions may include one or more instruction modules. The instruction modules may include computer program modules, which may be similar to, for example, a portion of machine-readable instructions 208/308/408/508/608/708. The instruction modules may include one or more of the modules disclosed herein and/or other instruction modules.

A network interface 818 may be directly or indirectly in operative electronic communication with, inter alia, processor 814. Network interface 818 may operatively link processor 814 and/or device 800 with one or more other computing platform(s), remote platform(s), and/or external resources via one or more electronic communication links. For example, such electronic communication links may be established, at least in part, via a network such as the internet and/or other networks using, for example, TCP/IP or cellular hardware enabling wired or wireless (e.g., cellular, 2G, 3G, 4G, 4G LTE, 5G, or WiFi) communication. It will be appreciated that this is not intended to be limiting, and that the scope of this disclosure includes embodiments in which device 800, one or more other computing platform(s), remote platform(s), and/or external resources may be operatively linked via some other communication media.

Processor 814 may be directly or indirectly in operative electronic communication with display 802. Display 802 may include a device (or "hardware component") that displays "display data" to form an image or images, such as, but not limited to, a picture, text, a desktop background, a gaming background, a video, an application window etc. One example of display 802 may include an integrated display as found in electronic devices such as handheld computing devices, electronic book readers, mobile telephones (smartphones), personal-digital-assistants (PDAs), wearable devices (smart-watches, smart-glasses, etc.). Display 802 may employ any appropriate display technology, such as for example, LCD flat panel, LED flat panel, flexible-panels, etc., and may include other display hardware that may, as needed for a particular electronic device, be operatively coupled to other devices and components. Therefore, display 802 may include display hardware such as, but not limited to, a frame buffer, hardware display drivers, etc. that store and refresh display data to be displayed by display 802. Also, display 802 may include integrated hardware for implementation of touchscreen functionality such that the display is operative to receive user input by touch or via a stylus.

The term "image" as used herein may refer generally to what is "displayed" on a display (e.g., display 802) and which may be stored in memory as "display data." That is, an image may be displayed on a display by sending the appropriate display data to the display. Examples of images may include, but are not limited to, a background or "wallpaper," a gaming background, a video, an application window, an icon, a widget, etc. In other words, the term "image" may refer to a background, or may refer individually, or collectively, to elements or objects in the foreground hovering over a background image such as wallpaper. The term "display data" may be used interchangeably herein with the term "image data" and refers to the information (data, or digital information) that the display interprets and/or decodes to show (i.e., to display) the user an image, as well as any associated elements or objects in the foreground of the background or wallpaper, etc.

Figure 9:
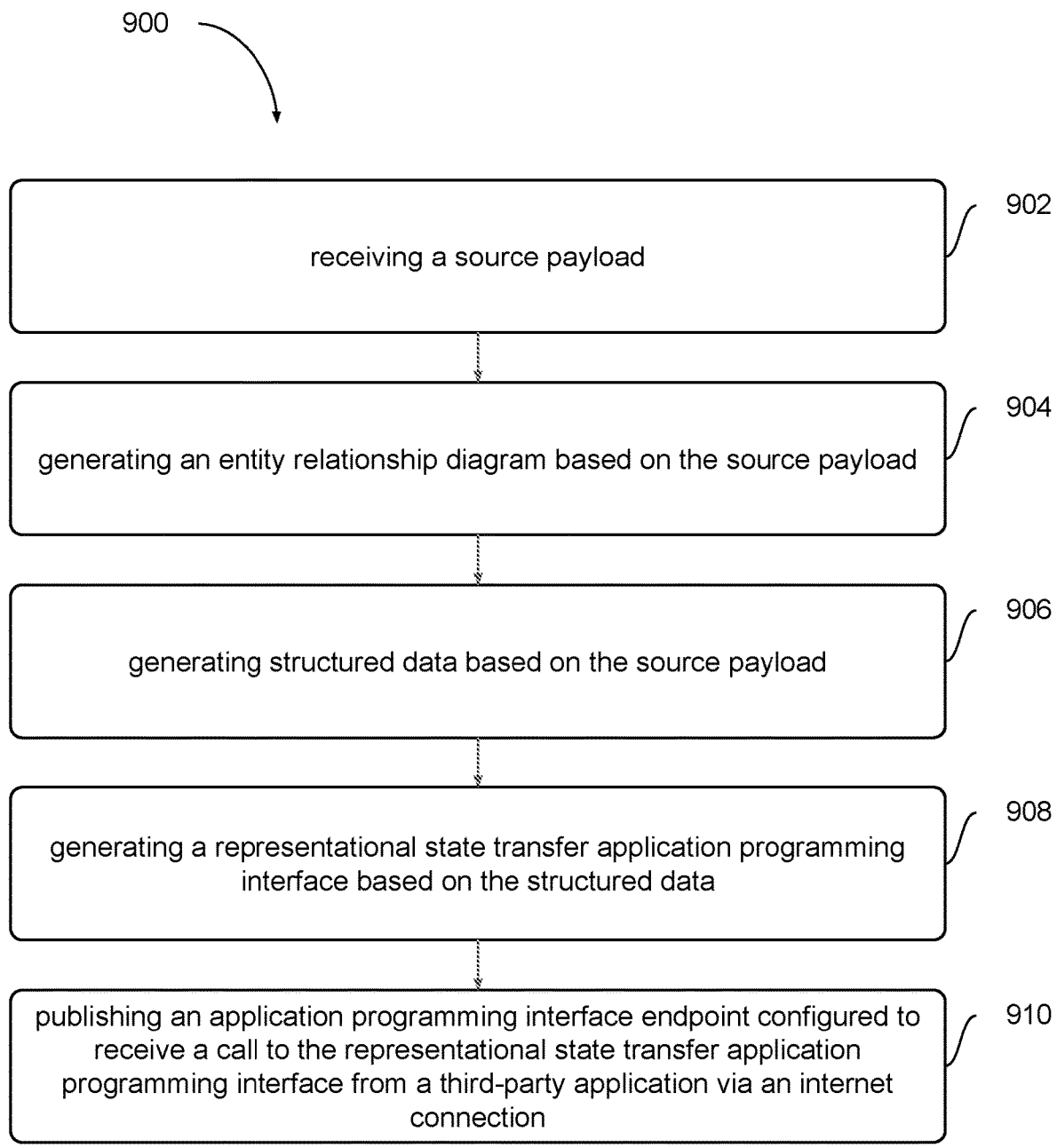
FIG. 9 illustrates a method for point-to-point data integration, according to an embodiment.

FIG. 9 illustrates a method 900 for point-to-point data integration, according to an embodiment. The operations of method 900 presented herein are intended to be illustrative. In some embodiments, method 900 may be accomplished with one or more additional operations not described, and/or without one or more of the operations discussed. Additionally, the order in which the operations of method 900 are illustrated in FIG. 9 and described herein is not intended to be limiting.

An operation 902 may include receiving a source payload. Operation 902 may be performed by one or more hardware processors configured by machine-readable instructions including a module in accordance with one or more embodiments.

An operation 904 may include generating an entity relationship diagram based on the source payload. The source payload may be received via an API call. The API call may include a REST API call. The source payload may include a variety of data structures, for example, a Javascript Object Notation (JSON) data structure. Operation 904 may be performed by one or more hardware processors configured by machine-readable instructions including a module in accordance with one or more embodiments.

An operation 906 may include generating structured data based on the source payload. Generating the structured data based on the source payload may include configuring a source detail and a target detail, selecting a data structure based on the source payload, applying, using the data structure, a filter to the source payload, and configuring a post script. Operation 906 may be performed by one or more hardware processors configured by machine-readable instructions including a module in accordance with one or more embodiments.

An operation 908 may include generating a representational state transfer application programming interface based on the structured data. Generating the REST API may include configuring a source detail and a target detail, selecting a data structure based on the source payload, applying, using the data structure, a filter to the source payload, and configuring a pre script. Operation 908 may be performed by one or more hardware processors configured by machine-readable instructions including a module in accordance with one or more embodiments.

An operation 910 may include publishing an application programming interface endpoint configured to receive a call to the representational state transfer application programming interface from a third-party application via an internet connection. The API endpoint may include, for example, a name and an object. Publishing the API endpoint may include configuring the object and the name, selecting an application programming interface method, selecting a field, and applying, using the field, a filter to the application programming interface.

Operation 910 may be performed by one or more hardware processors configured by machine-readable instructions including a module in accordance with one or more embodiments.

Figure 10:
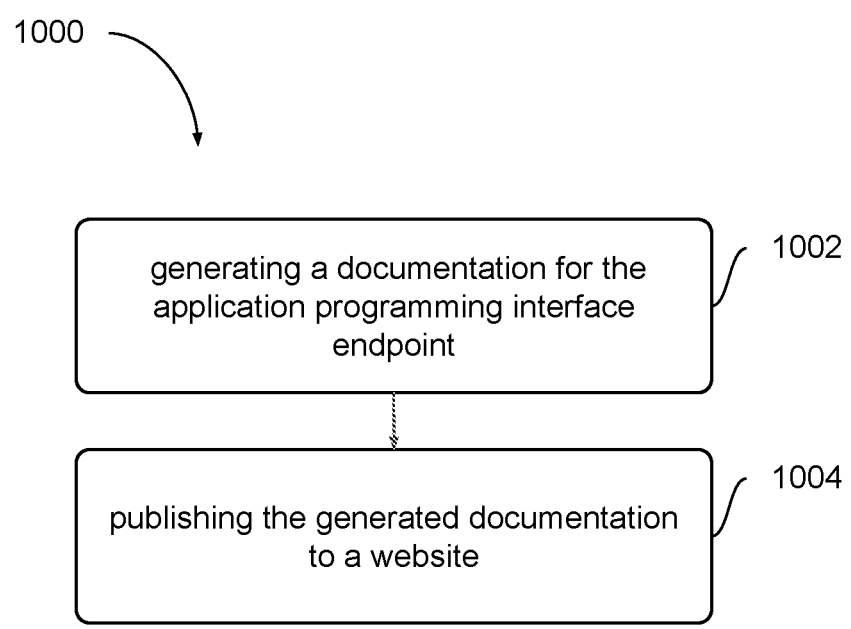
FIG. 10 illustrates a method for publishing documentation for a point-to-point data integration, according to an embodiment.

FIG. 10 illustrates a method 1000 for publishing documentation for a point-to-point data integration, according to an embodiment. The operations of method 1000 presented herein are intended to be illustrative. In some embodiments, method 1000 may be accomplished with one or more additional operations not described, and/or without one or more of the operations discussed. Additionally, the order in which the operations of method 1000 are illustrated in FIG. 10 and described herein is not intended to be limiting.

An operation 1002 may include generating documentation for the application programming interface endpoint. Operation 1002 may be performed by one or more hardware processors configured by machine-readable instructions including a module in accordance with one or more embodiments.

An operation 1004 may include publishing the generated documentation to a website. Operation 1004 may be performed by one or more hardware processors configured by machine-readable instructions including a module in accordance with one or more embodiments.

In some implementations or embodiments, method 900 or method 1000 may operate separately, in series, or in parallel. Method 900 or method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 or method 1000 in response to instructions stored electronically on an electronic storage medium. The one or more processing devices may include one or more devices configured through hardware, firmware, and/or software to be specifically designed for execution of one or more of the operations of method 900 or method 1000.

Various characteristics, advantages, embodiments, and/or examples relating to the invention have been described in the foregoing description with reference to the accompanying drawings. However, the above description and drawings are illustrative only. The invention is not limited to the illustrated embodiments and/or examples, and all embodiments and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described embodiments and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or claim limitation should not be interpreted to invoke 35 U.S.C. § 112(f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. A method, comprising:
   receiving, at a processor of an application server, a source payload;
   generating, using the processor, an entity relationship diagram based on the source payload;
   generating, using the processor, structured data based on the source payload;
   generating, using the processor, a representational state transfer application programming interface based on the structured data and based on objects and arrays defined in the entity relationship diagram; and
   publishing, using the processor, an application programming interface endpoint configured to receive a call to the representational state transfer application programming interface from a third-party application via an internet connection.

2. The method of claim 1, further comprising generating, using the processor, a documentation for the application programming interface endpoint.

3. The method of claim 2, further comprising publishing the documentation on a website.

4. The method of claim 2, wherein generating the documentation comprises:
   configuring, using the processor, a source detail and a target detail;
   selecting, using the processor, an object from the source payload;
   applying, using the processor, a filter to the source payload; and
   selecting, using the processor, a primary key for the object and a target attribute.

5. The method of claim 1, wherein generating the structured data based on the source payload comprises:
   configuring, using the processor, a source detail and a target detail;
   selecting, using the processor, a data structure based on the source payload;
   applying, using the processor and the data structure, a filter to the source payload; and
   configuring, using the processor, a post script.

6. The method of claim 1, wherein generating the representational state transfer application programming interface based on the structured data comprises:
   configuring, using the processor, a source detail and a target detail;
   selecting, using the processor, a data structure based on the source payload;
   applying, using the processor and the data structure, a filter to the source payload; and
   configuring, using the processor, a pre script.

7. The method of claim 1, wherein the application programming interface endpoint comprises a name and an object and wherein publishing the application programming interface endpoint comprises:
   configuring, using the processor, the object and the name;
   selecting, using the processor, an application programming interface method;
   selecting, using the processor, a field; and
   applying, using the processor and the field, a filter to the application programming interface.

8. The method of claim 1, wherein the processor receives the source payload via an application programming interface call.

9. The method of claim 8, wherein the application programming interface call includes a representational state transfer application programming interface call.

10. The method of claim 1, wherein the source payload comprises a Javascript Object Notation data structure.

11. A system, comprising:
a processor of an application server; and
an electronic storage device in electronic communication with the processor, the electronic storage device having a database stored thereon;
wherein the processor is configured to:
receive a source payload;
generate an entity relationship diagram based on the source payload;
generate structured data based on the source payload;
generate a representational state transfer application programming interface based on the structured data and based on objects and arrays defined in the entity relationship diagram; and
publish an application programming interface endpoint configured to receive a call to the representational state transfer application programming interface from a third-party application via an internet connection.

12. The system of claim 11, wherein the processor is further configured to generate a documentation for the application programming interface endpoint.

13. The system of claim 12, wherein generating the documentation comprises:
configuring a source detail and a target detail;
selecting an object from the source payload;
applying a filter to the source payload; and
selecting a primary key for the object and a target attribute.

14. The system of claim 11, wherein generating the structured data based on the source payload comprises:
configuring a source detail and a target detail;
selecting a data structure based on the source payload;
applying, using the data structure, a filter to the source payload; and
configuring a post script.

15. The system of claim 11, wherein generating the representational state transfer application programming interface based on the structured data comprises:
configuring a source detail and a target detail;
selecting a data structure based on the source payload;
applying, using the data structure, a filter to the source payload; and
configuring a pre script.

16. The system of claim 11, wherein the application programming interface endpoint comprises a name and an object and wherein publishing the application programming interface endpoint comprises:
configuring the object and the name;
selecting an application programming interface method;
selecting a field; and
applying, using the field, a filter to the application programming interface.

17. The system of claim 11, wherein the processor receives the source payload via an application programming interface call.

18. The system of claim 17, wherein the application programming interface call includes a representational state transfer application programming interface call.

19. The system of claim 11, wherein the source payload comprises a Javascript Object Notation data structure.

20. A non-transitory computer-readable media having instructions thereupon which when implemented by a processor cause the processor to perform a method comprising:
receiving a source payload;
generating an entity relationship diagram based on the source payload;
generating structured data based on the source payload;
generating a representational state transfer application programming interface based on the structured data and based on objects and arrays defined in the entity relationship diagram; and
publishing an application programming interface endpoint configured to receive a call to the representational state transfer application programming interface from a third party application via an internet connection.

* * * * *